May 15, 1951 — J. S. WRIGHT — 2,553,028
GUIDE FOR POSITIONING X-RAY LAMPS
Filed May 12, 1948
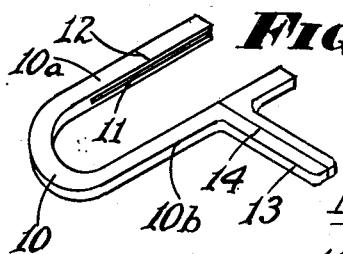
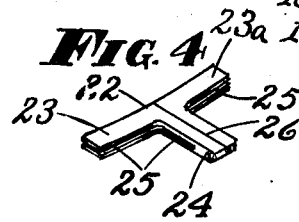
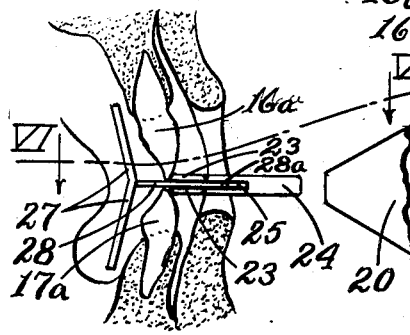
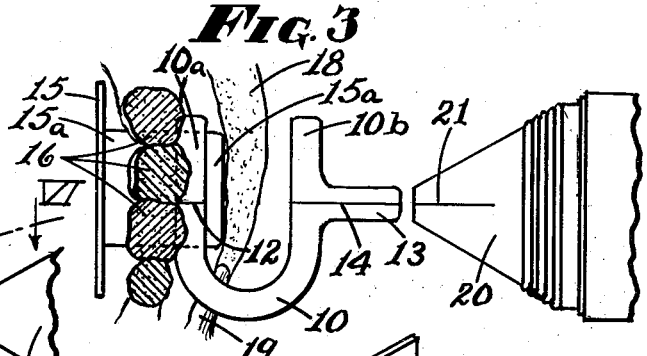
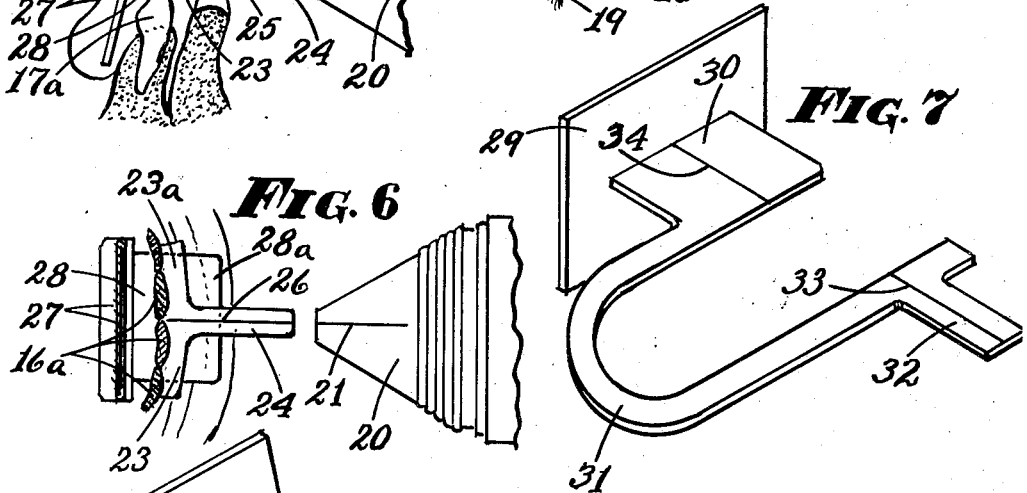
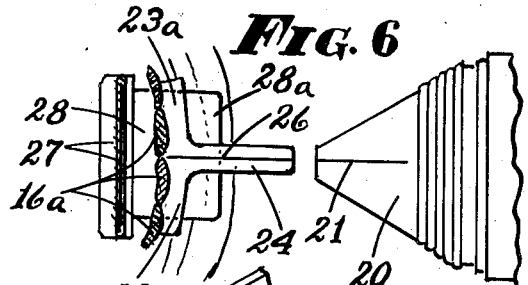
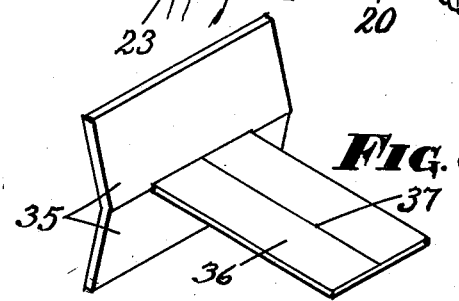
INVENTOR.
John S. Wright
BY M. Y. Charles
ATTORNEY Patented May 15, 1951

2,553,028

UNITED STATES PATENT OFFICE 2,553,028

GUIDE FOR POSITIONING X-RAY LAMPS

John S. Wright, Wichita, Kans.

Application May 12, 1948, Serial No. 26,522

2 Claims. (Cl. 250—70)

My invention relates to a device that may be used as a guide for positioning X-ray lamps. This device is used particularly in taking X-ray pictures of teeth. In as much as the teeth are covered by the flesh of the cheek of the face it is difficult to properly position the X-ray lamp so that the ray of the lamp is projected at the proper angle with regard to the teeth so that a clear picture is procured and as a result, on the film, one tooth will not overlap the adjacent tooth and the picture thereby become indistinct and confusing and very often not even usable.

In view of this trouble I have provided my guide device that may be used in connection with X-ray films that are contained in a small packet having a bite tab thereon. Film packets of this kind and their application or use are well known among dentists or practitioners who take X-ray pictures. In using the film packet the packet is placed in the patient's mouth and behind the teeth of which the picture is to be taken, and the bite tab is placed between the upper and lower teeth so that when the film is properly positioned the patient may close his teeth against the bite tab and thereby definitely hold the film in its proper adjusted position for taking the picture. This having been done, the X-ray lamp must be properly positioned so that the rays of the lamp will pass directly between the teeth and not at an angle so that the rays will pass through a part of two adjacent teeth and thereby produce a confused picture.

Without some guiding element it is very difficult to correctly position the X-ray lamp and as a result a very small percent of the X-ray pictures taken are good clear pictures. Therefor, in view of this trouble, I have provided my guide device for positioning X-ray lamps which is attachable to, or may be made as a part of the bite tab and includes index markings which may be used as a guide in positioning the X-ray lamp so as to procure the best X-ray picture. It will be understood that most X-ray lamps already have index markings thereon that may be used in conjunction with my improved guide for positioning X-ray lamps, and those lamps that do not have index markings thereon can easily be so marked.

My improved guide for positioning X-ray lamps has two general forms, one being a U-shaped device and the other a T-shaped device. The U-shaped device is used in taking pictures of the side or rear teeth of the upper and lower sets of teeth, and the T-shaped device is used in taking pictures of the front teeth of the upper and lower sets of teeth. The guide device is made of such material as will not obstruct or stop the rays of the X-ray lamp. The foregoing and other objects of my invention will be more fully described as this description progresses.

Now referring to the accompanying drawings—

Fig. 1 is a perspective detail view of the U-shaped form of my improved guide for positioning X-ray lamps.

Fig. 2 is a vertical detail sectional view through the upper and lower jaw and showing the teeth therein and also showing the film packet, bite tab, my improved guide device and the X-ray lamp, all in proper position for taking the X-ray picture.

Fig. 3 is a horizontal sectional view as seen from the line III—III in Fig. 2 and looking in the direction of the arrows.

Fig. 4 is a perspective detail view of the T-shaped guide device.

Fig. 5 is a detail vertical sectional view through the front or center portion of the upper and lower jaw showing the front teeth therein and also showing the film packet and bite tab thereon, the T-shaped guide device, and X-ray lamp, all of which are in proper position for taking the X-ray picture.

Fig. 6 is a detail sectional view taken along the line VI—VI in Fig. 5 and looking in the direction of the arrows.

Fig. 7 is a detail perspective view of an X-ray film packet having a bite tab on which is integrally formed the V-shaped guide device.

Fig. 8 is a detail perspective view of an X-ray film packet having the bite tab with an index mark there, which serves the same purpose as the T-shaped guide device shown in Fig. 4.

Similar numerals of reference designate the same parts throughout the several figures of the drawing.

In the drawings in Figures 1, 2 and 3 is shown my improved guide for positioning X-ray lamps which comprises a V-shaped element 10, one leg 10a of which is split as indicated at 11, and is provided with an index mark 12. The other leg 10b is provided with a laterally extending portion 13 that is provided with an index mark 14 that is in alignment with the index mark 12. The opposite sides of the leg 10a, the leg 10b and the laterally extending portion 13 are also marked with index marks the same as 12 and 14 so that the device may be turned over for use on either side of the mouth and the index marks 12 and 14 will be exposed for guide purposes as will later be explained.

The use of the device is as follows: The film packet 15 is placed in the mouth of the patient and behind the area of which the picture is to be taken, and the bite tab 15a is positioned between the upper teeth 16 and the lower teeth 17 and rigidly held in position by the pressure of the teeth 16 and 17 as shown in Fig. 2, and the outer end of the tab 15a extending well beyond the teeth and possibly resting against the inside surface of the cheek 18. The X-ray film having thus been properly positioned, the guide is then applied by inserting the leg 10a through the mouth 19 of the patient and positioning the tab 15a in the split 11 and then positioning the index mark 12 at the central point of the picture that is desired to be taken, the leg 10a resting against the teeth so as to establish substantially a right angle to the center point of the picture to be taken. The leg 10b extends along the outside of the cheek 18, whereupon the index mark 14 establishes or reveals the line along which the center axis of the X-ray must be directed in order to secure the correct and desired perfect picture. This having been done, the X-ray lamp 20 is now moved to a position adjacent the end of the outwardly projecting portion 13 of the guide device and the alignment or index mark 21 is positioned in a vertical plane in which lies the index lines 12 and 14, whereupon the picture may be taken. The result is a full and clear picture of each tooth which is the thing sought and accomplished by the use of my improved guide for positioning X-ray lamps.

In Figures 4, 5, and 6 is shown an adaptation of my improved guide for positioning X-ray lamps in which the device is a T-shaped piece 22, the laterally extending portion 23 and 23a, and a portion of the leg 24 are split as indicated at 25. On each side of the device is an index mark 26 that runs the full length of the leg 24 and across the width of the laterally extending head portion 23—23a. The head portion 23—23a is slightly curved to somewhat fit the curvature of the front of the sets of upper and lower front teeth 16a and 17a respectively.

The operation of the device is as follows: The film packet 27 is placed in the mouth of the patient and behind the teeth 16a and 17a and so positioned as to cover the area to be included in the picture, the bite tab 28 being positioned and rigidly held in said position by the teeth 16a and 17a and which in turn holds the film packet in its proper position, and the outer end 28a of the bite tab 28 extends well beyond the front teeth 16a and 17a. Now the guide device is placed with the head 23—23a against the front teeth 16a and 17a with the outer end 28a of the bite tab 28 positioned in the split 25 of the T formation 23—23a—24, and the inner end of the index mark 26 is positioned at the central point of the picture that is to be taken. The index mark 26 is now substantially at right angles to the film in the 27 and establishes or reveals the line along which the ray of the X-ray lamp should be directed to obtain a full and clear picture of each tooth 16a and 17a.

This having been done, the end of the X-ray lamp 20 is now moved to a point adjacent the outer end of the leg 24 of the guide device and the index mark 21 on the X-ray lamp is positioned in a vertical plane in which lies the guide index mark 26; the picture may now be taken and the result will be a full and complete picture of each tooth included in the picture.

In Fig. 7 is shown a film packet 29 having the bite tab 30 on which is integrally formed the U-shaped guide element 31 having the outwardly extending portion 32 and the index line 33 thereon that is in alignment with an index line 34 on the tab 30. The device may be used the same as described for Figures 2 and 3, except that when the film packet is properly positioned the guide device is automatically properly positioned and the picture may be taken the same as previously described.

In Fig. 8 is shown a film packet 35 having the bite tab 36 on which is an index mark 37. This device is for use in taking pictures of front teeth and is used the same as described for Figures 5 and 6 except that when the film packet 35 and tab 36 are properly positioned, the index mark 37 is also properly positioned and the picture may be taken the same as previously described.

Such modifications of my invention may be employed as lie within the scope of the appended claims without departing from the spirit and intention of my invention. Now having fully shown and described my invention, what I claim is:

1. In a film holder and guide device for properly positioning a film and X-ray lamp for taking pictures of teeth; said device being made of a single piece of material and comprising in combination a flat U-shaped element having a bite tab integrally formed on one end of one of the legs of the U and being positioned outwardly from the end of the U-leg on which it is formed at an angle of substantially ninety degrees, a film holder, said film holder being integrally formed on the outer end of the bite tab and being connected thereto on one side thereof and at its central portion, an index supporting element, said index supporting element being integrally formed on the outer end portion of the other leg of the U and extending outwardly therefrom at an angle of substantially ninety degrees and in alignment with the bite tab, a pair of index lines, said index lines being positioned one on the bite tab and the other on the index supporting element, said index lines being in alignment with each other and at right angles to the line of joinder of the film holder and bite tab, for the purposes described.

2. In a film holder and guide device for properly positioning a film and X-ray lamp for taking pictures of teeth; the combination defined in claim 1, said combination being further characterized by the film holding means being flexible and being bendable angularly along its line of joinder to the bite tab.

JOHN S. WRIGHT.

REFERENCES CITED

The following references are of record in the file of this patent:

UNITED STATES PATENTS

| Number | Name | Date |
| --- | --- | --- |
| 1,445,169 | Ralph | Feb. 13, 1923 |
| 1,698,795 | Hillman | Jan. 15, 1929 |
| 2,034,049 | Levy | Mar. 17, 1936 |
| 2,239,569 | Poindexter | Apr. 22, 1941 |
| 2,392,109 | Vlock | Jan. 1, 1946 |